United States Patent
Liu et al.

(10) Patent No.: US 6,820,528 B1
(45) Date of Patent: Nov. 23, 2004

(54) CUTTING APPARATUS WITH A POSITION ADJUSTABLE LIGHT-EMITTING UNIT

(75) Inventors: Ta-Chang Liu, Taichung (TW); Yueh-Hsun Chang, Nan-Tou Hsien (TW)

(73) Assignee: P&F Brother Industrial Corporation, Taichung (TW)

( * ) Notice: Subject to any disclaimer, the term of this patent is extended or adjusted under 35 U.S.C. 154(b) by 0 days.

(21) Appl. No.: 10/628,710

(22) Filed: Jul. 28, 2003

(30) Foreign Application Priority Data

May 8, 2003 (TW) ..................................... 92208418 U

(51) Int. Cl.⁷ .............................. B26D 7/27; B27B 5/29
(52) U.S. Cl. ....................................... 83/520; 83/471.3
(58) Field of Search ....................... 83/520, 521, 471.3, 83/522.15, 581

(56) References Cited

U.S. PATENT DOCUMENTS

| | | | |
|---|---|---|---|
| 4,875,398 A | * | 10/1989 | Taylor et al. .................. 83/520 |
| 6,755,107 B2 | * | 6/2004 | Peot et al. ..................... 83/520 |
| 2003/0140758 A1 | * | 7/2003 | Weusthof et al. ............. 83/520 |

* cited by examiner

*Primary Examiner*—Stephen Choi
(74) *Attorney, Agent, or Firm*—Townsend and Townsend and Crew LLP

(57) ABSTRACT

A cutting apparatus includes a base, a blade-holding arm pivoted to the base through a pivot and co-rotatable with the pivot, a light-emitting unit pivoted to the blade-holding arm, and a position-adjusting unit including a first linkage that is secured to the pivot, and a second linkage that has two opposite ends which are respectively pivoted to the first linkage and the light-emitting unit.

5 Claims, 5 Drawing Sheets

CUTTING APPARATUS WITH A POSITION ADJUSTABLE LIGHT-EMITTING UNIT

CROSS-REFERENCE TO RELATED APPLICATION

This application claims priority of Taiwanese application No. 092208418, filed on May 8, 2003.

BACKGROUND OF THE INVENTION

1. Field of the Invention

This invention relates to a cutting apparatus with a position adjustable light-emitting unit for maintaining projection of a spotlight upon a working area around a workpiece during a cutting operation.

2. Description of the Related Art

A light source is normally provided for illuminating a working area around a cutting apparatus, such as a circular saw. It is known that a light-emitting unit can be fixed to a blade-holding arm of the circular saw for projecting a spotlight upon an area around a workpiece on a base of the circular saw. However, since the light-emitting unit pivots together with the blade-holding arm relative the base of the circular saw, the spotlight projected from the light-emitting unit will move when the blade-holding arm is pivoted during a cutting operation, which can result in poor illumination on the area around the workpiece, thereby adversely affecting the quality of the cutting operation.

SUMMARY OF THE INVENTION

Therefore, the object of the present invention is to provide a cutting apparatus that is capable of overcoming the aforesaid drawback of the prior art.

According to the present invention, there is provided a cutting apparatus that comprises: a base adapted to support a workpiece thereon; a pivot extending in a longitudinal direction and defining a first axis; a blade-holding arm extending in a transverse direction relative to the longitudinal direction and having a free end and a pivot end that is opposite to the free end and that is pivoted to the base through the pivot so as to be pivotable relative to the base about the first axis, the pivot being secured to the pivot end of the blade-holding arm for co-rotation therewith about the first axis; a blade mounted rotatably on the blade-holding arm for cutting the workpiece; a light-emitting unit pivoted to the blade-holding arm at a position between the free end and the pivot end of the blade-holding arm so as to be pivotable relative to the blade-holding arm about a second axis that extends in the longitudinal direction and that is parallel to the first axis, the light-emitting unit being adapted to project a spotlight upon a working area around the workpiece on the base; and a position-adjusting unit including a first linkage that is secured to the pivot so as to co-rotate therewith, and a second linkage that has two opposite ends which are respectively pivoted to the first linkage and the light-emitting unit in such a manner that pivoting movement of the blade-holding arm relative to the base about the first axis in a first direction results in corresponding pivoting movement of the light-emitting unit relative to the base about the first axis in the first direction and relative to the blade-holding arm about the second axis in a second direction opposite to the first direction to an extent sufficient to maintain projection of the spotlight upon the working area.

BRIEF DESCRIPTION OF THE DRAWINGS

In drawings which illustrate an embodiment of the invention.

DETAILED DESCRIPTION OF THE PREFERRED EMBODIMENT

Figure 1:
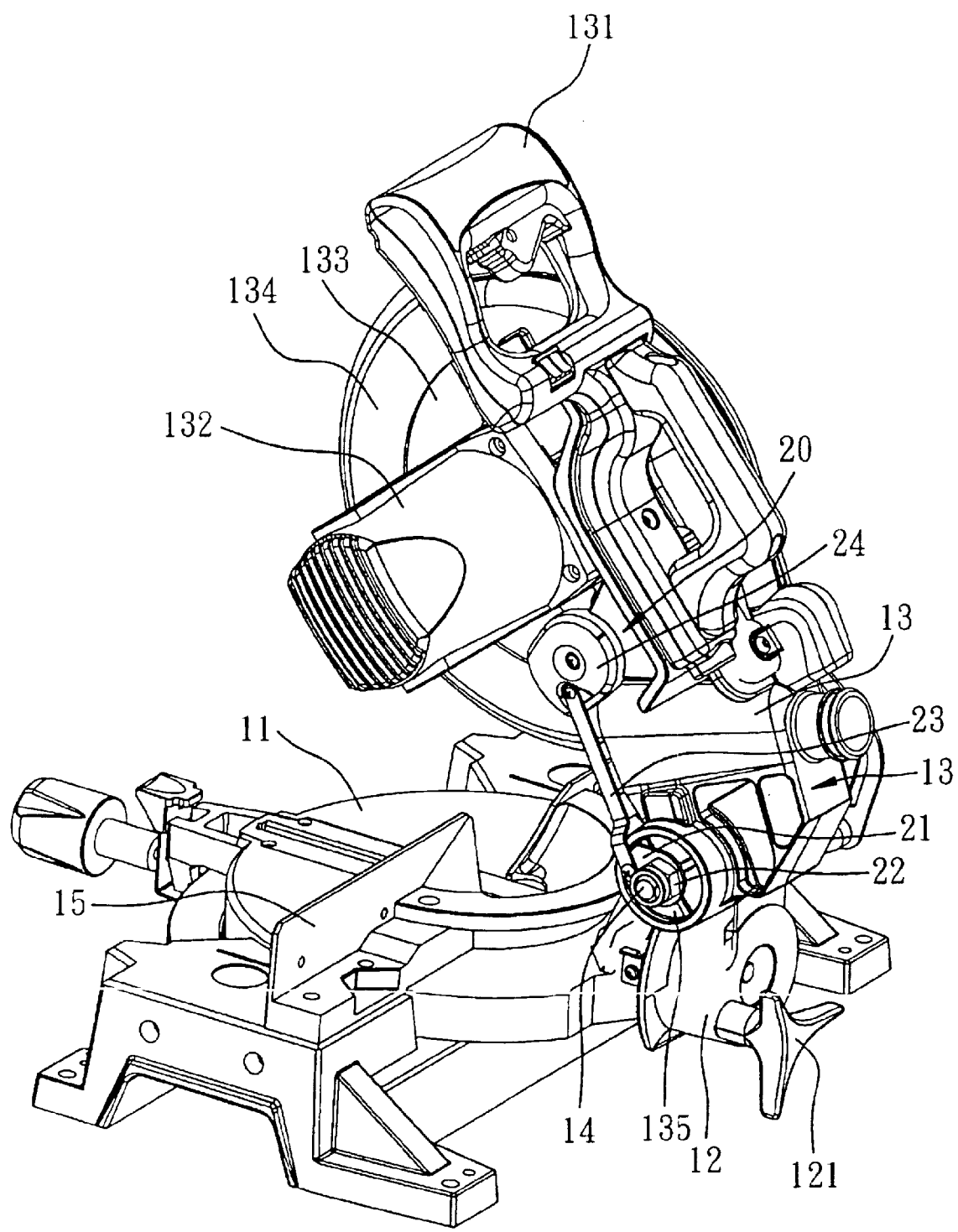
FIG. 1 is a perspective view of the preferred embodiment of a cutting apparatus according to the present invention.
Figure 2:
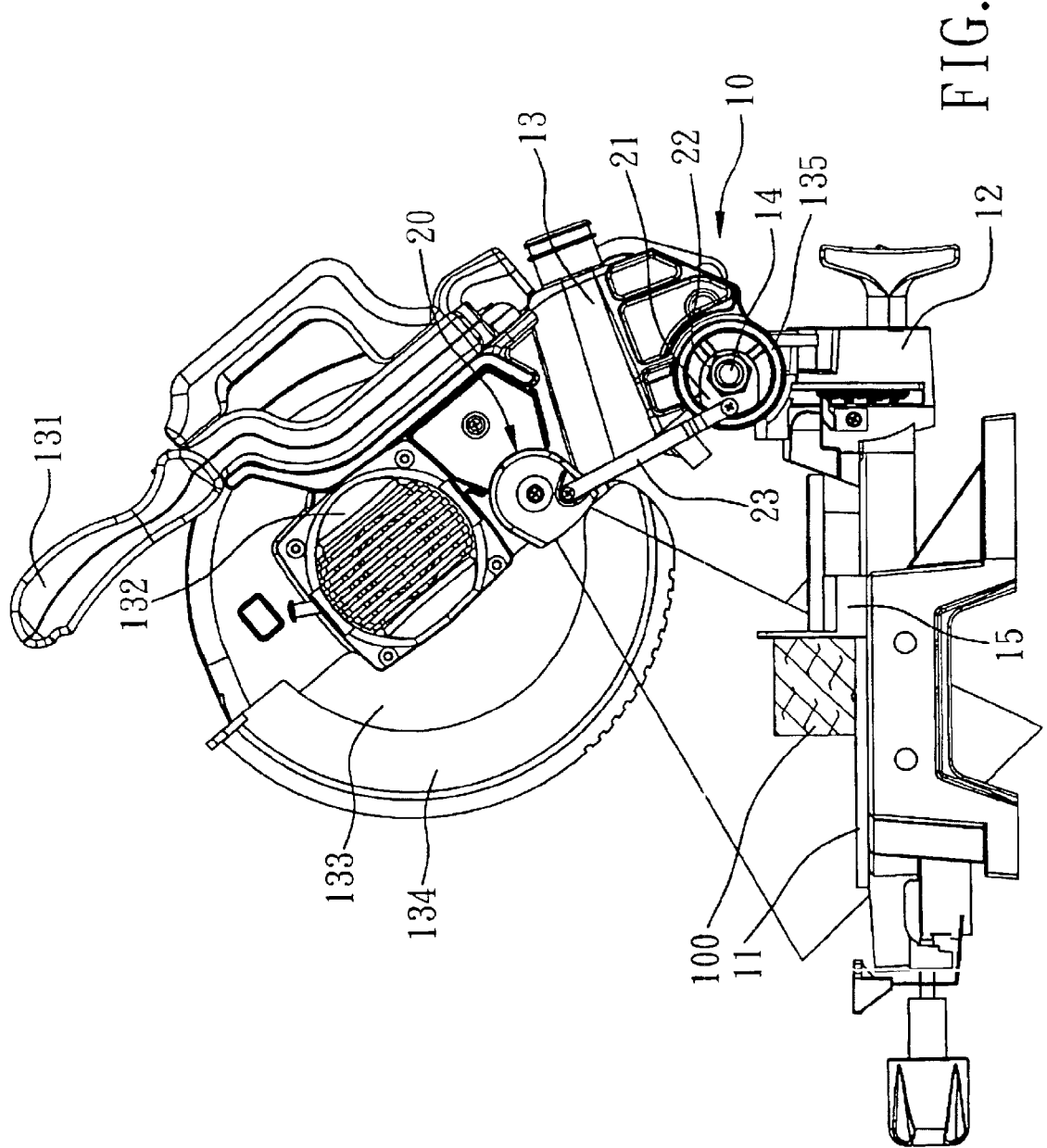
FIG. 2 is a schematic view of the cutting apparatus of FIG. 1 with a light-emitting unit disposed at an upper position relative to a blade-holding arm.
Figure 3:
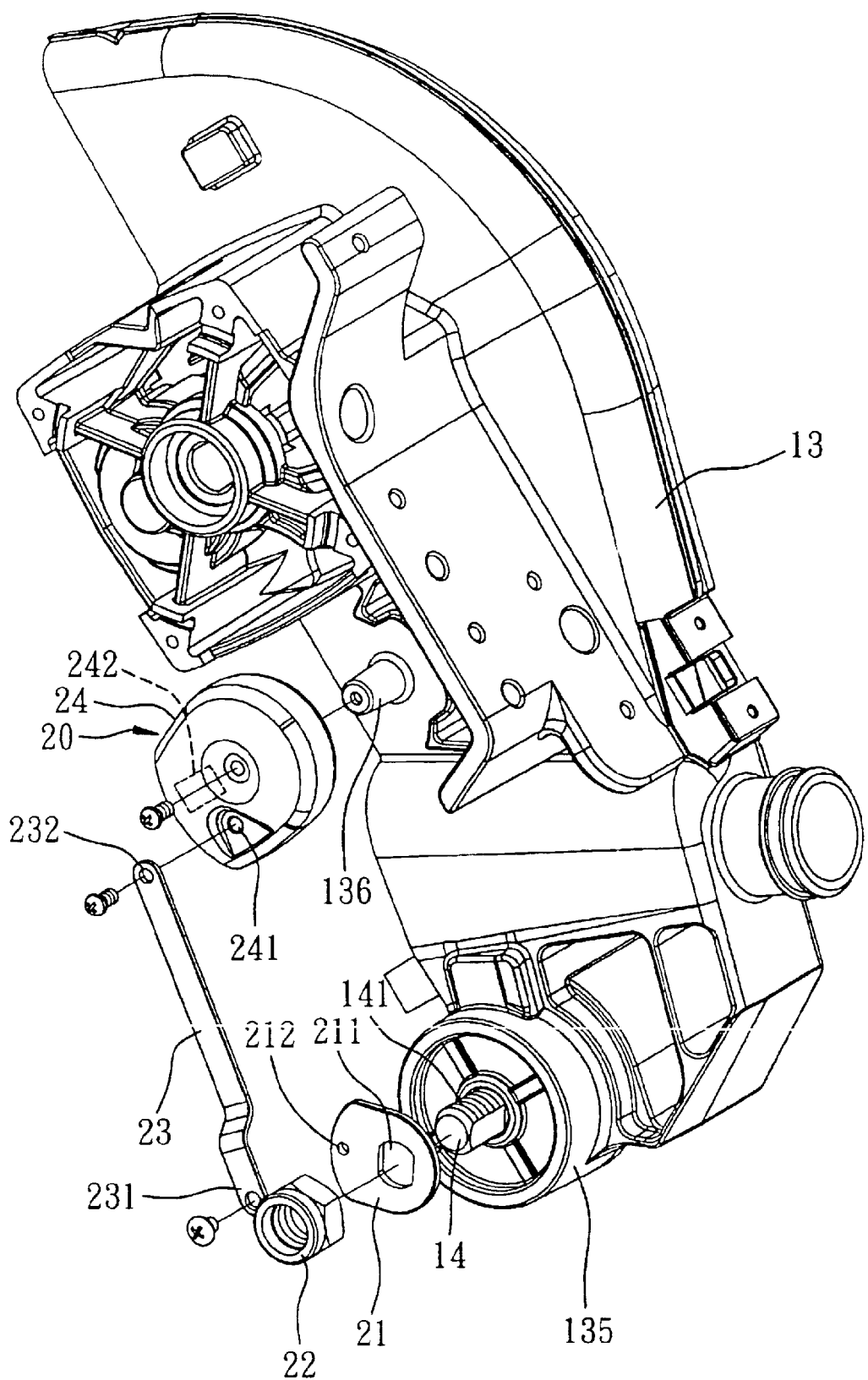
FIG. 3 is a partly exploded fragmentary perspective view of the cutting apparatus of FIG. 1.
Figure 4:
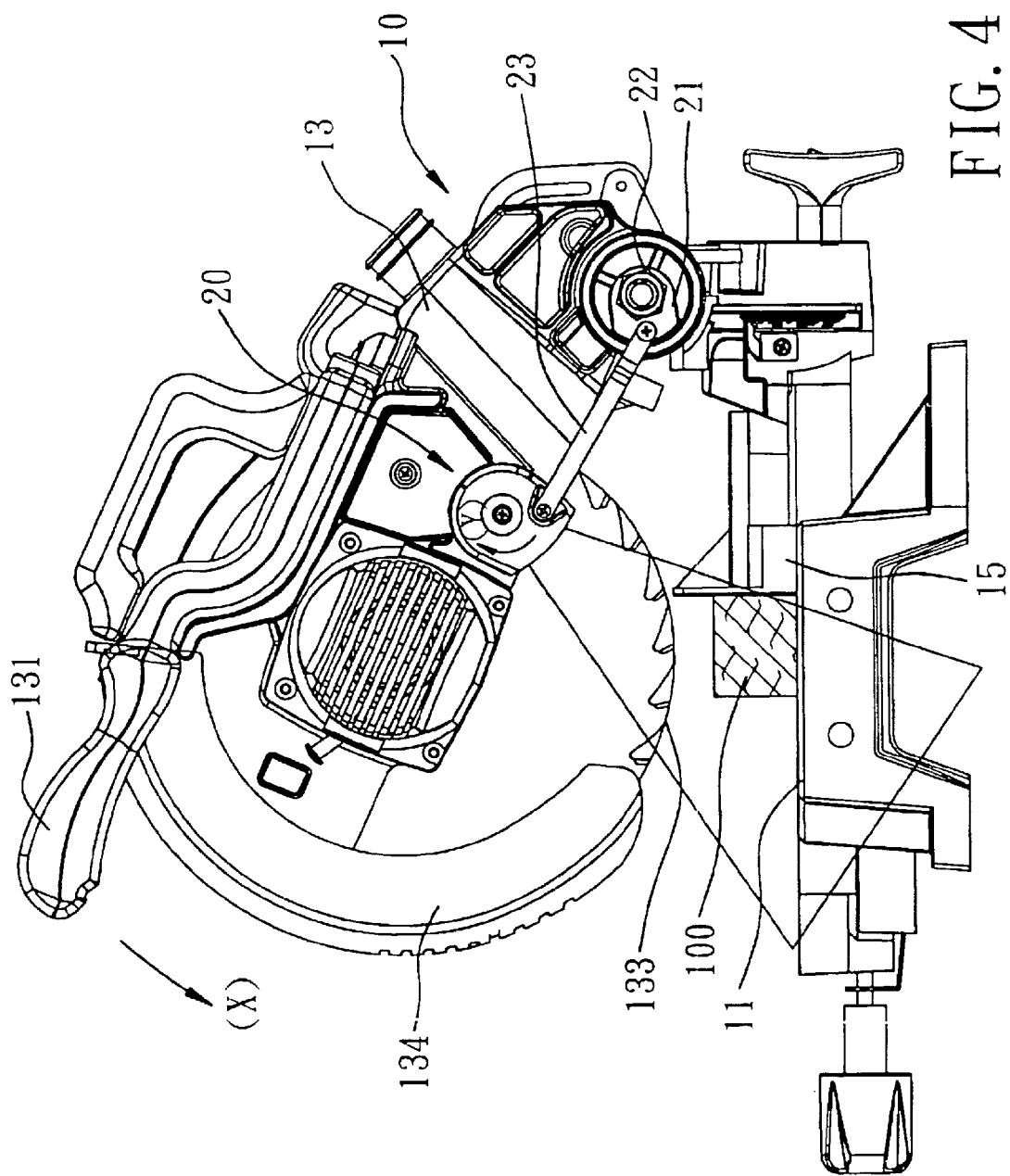
FIG. 4 is a schematic view of the cutting apparatus of FIG. 1 with the light-emitting unit disposed at a middle position relative to the blade-holding arm.
Figure 5:
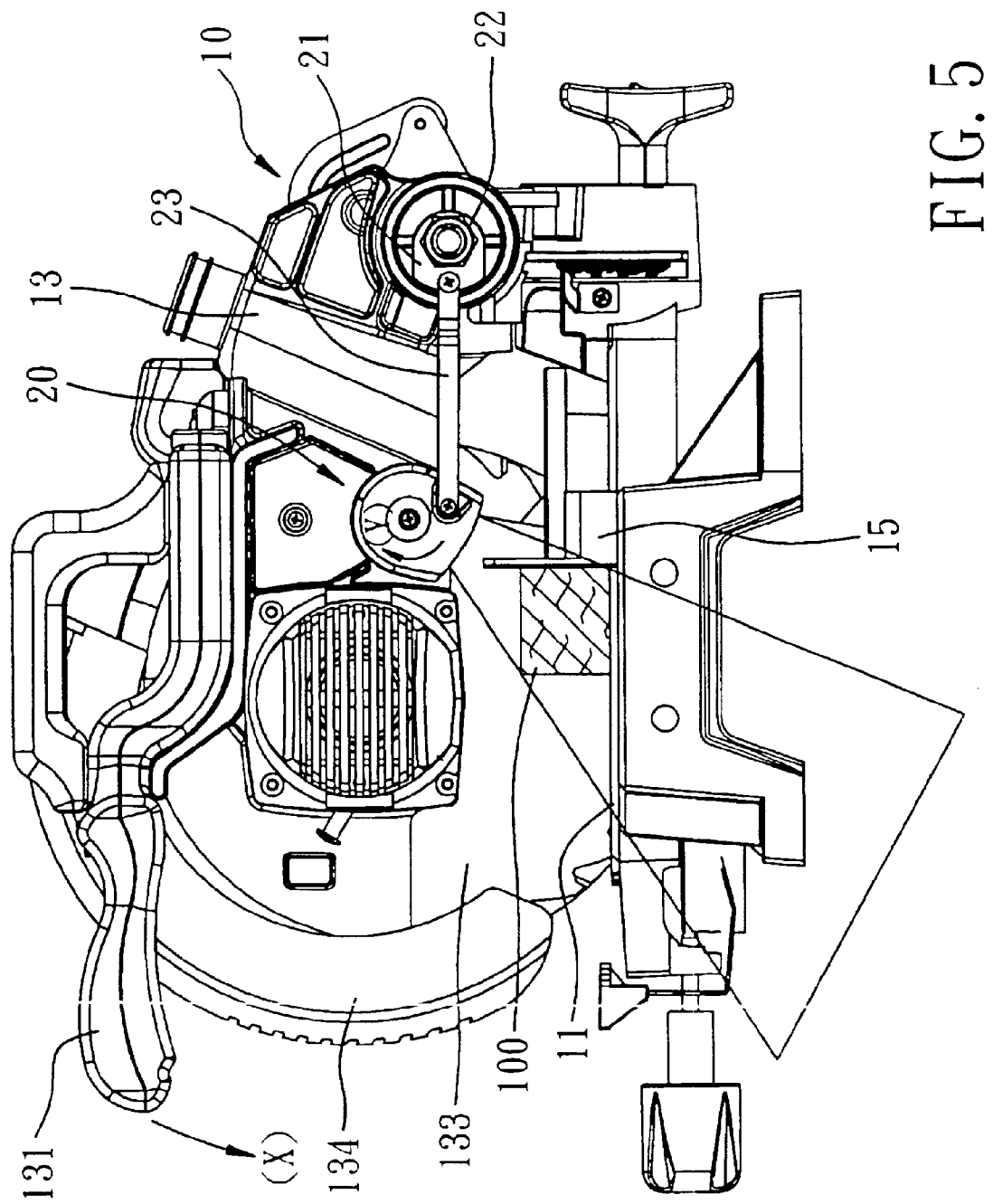
FIG. 5 is a schematic view of the cutting apparatus of FIG. 1 with the light-emitting unit disposed at a lower position relative to the blade-holding arm.

FIGS. 1 to 3 illustrate a cutting apparatus 10 that includes: a base 11 adapted to support a workpiece 100 thereon and formed with a pivot seat 12 on a rear end thereof; a first pivot 14 extending in a longitudinal direction and defining a first axis; a blade-holding arm 13 extending in a transverse direction relative to the longitudinal direction and having a free end 131 that serves as a handle, and a pivot end 135 that is opposite to the free end 131 and that is pivoted to the pivot seat 12 of the base 11 through the first pivot 14 so as to be pivotable relative to the base 11 about the first axis, the first pivot 14 being secured to the pivot end 135 of the blade-holding arm 12 for co-rotation therewith about the first axis, the blade-holding arm 13 being formed with a second pivot 136 that is disposed at a position between the free end 131 and the pivot end 135, that projects therefrom in the longitudinal direction, and that defines a second axis; a blade 133 mounted rotatably on the blade-holding arm 13 for cutting the workpiece 100; a motor 132 mounted on the blade-holding arm 13 for driving the blade 133; a blade guard 134 mounted movably on the blade-holding arm 13 for covering the blade 133 when the cutting apparatus 10 is idle; a light-emitting unit 20 pivoted to the blade-holding arm 13 through the second pivot 136 of the blade-holding arm 13 so as to be pivotable relative to the blade-holding arm 13 about the second axis that extends in the longitudinal direction and that is parallel to the first axis, the light-emitting unit 20 being adapted to project a spotlight upon a working area around the workpiece 100 on the base 11; and a position-adjusting unit including a first linkage 21 that is secured to the first pivot 14 so as to co-rotate therewith, and a second linkage 23 that has two opposite ends 231, 232 which are respectively pivoted to the first linkage 21 and the light-emitting unit 20 in such a manner that pivoting movement of the blade-holding arm 13 relative to the base 11 about the first axis in a first direction (X)(see FIGS. 4 and 5) results in corresponding pivoting movement of the light-emitting unit 20 relative to the base 11 about the first axis in the first direction (X) and relative to the blade-holding arm 13 about the second axis in a second direction (Y) opposite to the first direction (X) to an extent sufficient to maintain projection of the spotlight upon the working area. FIGS. 2, 4, and 5 illustrate consecutive pivoting movement of the blade-holding arm 13 from an upper position (see FIG. 2) to a middle position (see FIG. 4), and then to a lower position (see FIG. 5). The spotlight projected from the light-emitting unit 20 is maintained in a direction toward the working area around the workpiece 100 during movement of the blade-holding arm 13 from the upper position to the lower position.

The light-emitting unit 20 includes a casing 24 mounted pivotally on the second pivot 136 and opening downwardly, and an LED light-emitting member 242 mounted securely in the casing 24 for projecting the spotlight on the workpiece 100 when actuated.

The first pivot 14 has a non-circular threaded end portion 141 that projects outwardly from the pivot end 135 of the blade-holding arm 13 in the longitudinal direction. The first linkage 21 is in the form of a plate that is formed with a non-circular through-hole 211 for extension of the end portion 141 of the first pivot 114 therethrough. The cutting apparatus 10 further includes a screw nut 22 that threadedly engages the end portion 141 of the first pivot 14 so as to fasten the first linkage 21 to the first pivot 14.

The casing 24 is formed with a pivot hole 241 that is offset from the second pivot 136. The first linkage 21 is further formed with a pivot hole 212 that is offset from the non-circular through-hole 211. The opposite ends 231, 232 of the second linkage 23 are respectively pivoted to the first linkage 21 and the casing 24 at the pivot holes 212, 241 in the first linkage 21 and the casing 24.

A stopper 15 extends upwardly from the base 11 and is disposed to abut against the workpiece 100 during the cutting operation.

With the inclusion of the position adjusting unit in the cutting apparatus of this invention, the aforesaid drawback associated with the prior art can be eliminated.

With the invention thus explained, it is apparent that various modifications and variations can be made without departing from the spirit of the present invention.

We claim:

1. A cutting apparatus comprising:

a base adapted to support a workpiece thereon;

a first pivot extending in a longitudinal direction and defining a first axis;

a blade-holding arm extending in a transverse direction relative to said longitudinal direction and having a free end and a pivot end that is opposite to said free end and that is pivoted to said base through said first pivot so as to be pivotable relative to said base about said first axis, said first pivot being secured to said pivot end of said blade-holding arm for co-rotation therewith about said first axis;

a blade mounted rotatably on said blade-holding arm for cutting the workpiece;

a light-emitting unit pivoted to said blade-holding arm at a position between said free end and said pivot end of said blade-holding arm so as to be pivotable relative to said blade-holding arm about a second axis that extends in said longitudinal direction and that is parallel to said first axis, said light-emitting unit being adapted to project a spotlight upon a working area around the workpiece on said base; and a position-adjusting unit including a first linkage that is secured to said first pivot so as to co-rotate therewith, and a second linkage that has two opposite ends which are respectively pivoted to said first linkage and said light-emitting unit in such a manner that pivoting movement of said blade-holding arm relative to said base about said first axis in a first direction results in corresponding pivoting movement of said light-emitting unit relative to said base about said first axis in said first direction and relative to said blade-holding arm about said second axis in a second direction opposite to said first direction to an extent sufficient to maintain projection of the spotlight upon the working area.

2. The cutting apparatus of claim 1, wherein said blade-holding arm is formed with a second pivot that projects therefrom in said longitudinal direction and that defines said second axis, said light-emitting unit being pivoted to said blade-holding arm through said second pivot.

3. The cutting apparatus of claim 2, wherein said light-emitting unit includes a casing mounted pivotally on said second pivot and opening downwardly, and a light-emitting member mounted securely in said casing.

4. The cutting apparatus of claim 3, wherein said first pivot has a non-circular threaded end portion that projects outwardly from said pivot end of said blade-holding arm in said longitudinal direction, said first linkage being in the form of a plate that is formed with a non-circular through-hole for extension of said end portion of said first pivot therethrough, said cutting apparatus further comprising a screw nut that threadedly engages said end portion of said first pivot so as to fasten said first linkage to said first pivot.

5. The cutting apparatus of claim 4, wherein said casing is formed with a pivot hole that is offset from said second pivot, said first linkage being further formed with a pivot hole that is offset from said non-circular through-hole, said opposite ends of said second linkage being respectively pivoted to said first linkage and said casing at said pivot holes in said first linkage and said casing.

* * * * *